(12) United States Patent
Nishar et al.

(10) Patent No.: US 9,558,613 B2
(45) Date of Patent: *Jan. 31, 2017

(54) SOCIAL NETWORK INTERACTION VIA GAMES

(71) Applicant: LinkedIn Corporation, Mountain View, CA (US)

(72) Inventors: Dipchand Nishar, Los Altos, CA (US); Siva Visakan Sooriyan, San Francisco, CA (US); Mauroof Ahmed, San Francisco, CA (US); Sumanth Kolar, San Francisco, CA (US); Piyush Nitin Gadigone, Waterloo (CA)

(73) Assignee: LinkedIn Corporation, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,399

(22) Filed: Jun. 17, 2016

(65) Prior Publication Data

US 2016/0300434 A1  Oct. 13, 2016

Related U.S. Application Data

(63) Continuation of application No. 14/319,955, filed on Jun. 30, 2014, now Pat. No. 9,381,434.

(51) Int. Cl.
*A63F 9/24* (2006.01)
*A63F 13/00* (2014.01)
*G07F 17/32* (2006.01)
*A63F 13/355* (2014.01)

(52) U.S. Cl.
CPC ......... *G07F 17/3211* (2013.01); *A63F 13/355* (2014.09); *G07F 17/326* (2013.01)

(58) Field of Classification Search
CPC .......... A63F 13/10; A63F 13/12; A63F 13/79; A63F 13/795; A63F 2300/5546; G06Q 50/01; G07B 7/02; G07F 17/3237
See application file for complete search history.

(56) References Cited

U.S. PATENT DOCUMENTS

| | | | |
|---|---|---|---|
| 8,234,195 | B1 | 7/2012 | Berhanu et al. |
| 8,522,152 | B2 | 8/2013 | Baldwin et al. |
| 8,589,807 | B2 | 11/2013 | Baldwin et al. |

(Continued)

OTHER PUBLICATIONS

"U.S. Appl. No. 14/319,955, Examiner Interview Summary mailed May 18, 2015", 3 pgs.
"U.S. Appl. No. 14/319,955, Examiner Interview Summary mailed Aug. 24, 2015", 3 pgs.
"U.S. Appl. No. 14/319,955, Final Office Action mailed Jun. 10, 2015", 12 pgs.

(Continued)

*Primary Examiner* — Milap Shah
(74) *Attorney, Agent, or Firm* — Schwegman Lundberg & Woessner, P.A.

(57) ABSTRACT

Techniques for enabling members to learn about and interact with their social network via games are described. According to various embodiments, it is determined that a content item or entity associated with an online social network service is relevant to a member of the online social network service. An online game including a game question and a correct game answer is generated based on the content item or entity. The game question is then displayed to the member, and a member response to the displayed game question is received. Thereafter, a game result is displayed, and the member is enabled to interact with the content item or entity.

20 Claims, 15 Drawing Sheets

(56) References Cited

U.S. PATENT DOCUMENTS

| | | |
|---|---|---|
| 8,701,019 B2 | 4/2014 | Baldwin et al. |
| 8,814,699 B1 | 8/2014 | Daniel |
| 9,381,434 B2 * | 7/2016 | Nishar .................... A63F 13/12 |
| 2003/0060284 A1 | 3/2003 | Hamalainen et al. |
| 2008/0294637 A1 | 11/2008 | Liu |
| 2009/0075738 A1 | 3/2009 | Pearce |
| 2009/0186330 A1 | 7/2009 | Brownholtz et al. |
| 2009/0222551 A1 | 9/2009 | Neely et al. |
| 2010/0081120 A1 | 4/2010 | Nanjiani et al. |
| 2011/0275047 A1 | 11/2011 | Gomes et al. |
| 2012/0122588 A1 | 5/2012 | Berger et al. |
| 2012/0142428 A1 | 6/2012 | Wilson et al. |
| 2013/0022954 A1 | 1/2013 | Moxley et al. |
| 2013/0260895 A1 | 10/2013 | Graf et al. |
| 2014/0141888 A1 | 5/2014 | Pavlish |
| 2015/0375104 A1 | 12/2015 | Nishar et al. |

OTHER PUBLICATIONS

"U.S. Appl. No. 14/319,955, Non Final Office Action mailed Jan. 28, 2015", 12 pgs.

"U.S. Appl. No. 14/319,955, Non Final Office Action mailed Oct. 16, 2015", 8 pgs.

"U.S. Appl. No. 14/319,955, Notice of Allowance mailed Mar. 8, 2016", 11 pgs.

"U.S. Appl. No. 14/319,955, Response filed Jan. 14, 2016 to Non Final Office Action mailed Oct. 16, 2015", 10 pgs.

"U.S. Appl. No. 14/319,955, Response filed May 28, 2015 to Non Final Office Action mailed Jan. 28, 2015", 19 pgs.

"U.S. Appl. No. 14/319,955, Response filed Oct. 7, 2015 to Final Office Action mailed Jun. 10, 2015", 20 pgs.

"U.S. Appl. No. 14/319,955, Response filed Nov. 10, 2014 to Restriction Requirement mailed Sep. 9, 2014", 9 pgs.

"U.S. Appl. No. 14/319,955, Restriction Requirement mailed Sep. 9, 2014", 5 pgs.

* cited by examiner

SOCIAL NETWORK INTERACTION VIA GAMES

CROSS-REFERENCE TO RELATED APPLICATIONS

This application is a continuation of prior application Ser. No. 14/319,955, filed on Jun. 30, 2014, which is incorporated by reference herein in its entirety.

TECHNICAL FIELD

The present application relates generally to data processing systems and, in one specific example, to techniques for enabling members to learn about and interact with their social network via games.

BACKGROUND

Online social network services such as LinkedIn® are becoming increasingly popular, with many such websites boasting millions of active members. Each member of the online social network service is able to upload an editable member profile page to the online social network service. Further, each member of the online social network service may have any number of member connections.

BRIEF DESCRIPTION OF THE DRAWINGS

Some embodiments are illustrated by way of example and not limitation in the figures of the accompanying drawings in which.

DETAILED DESCRIPTION

Example methods and systems for enabling members to learn about and interact with their social network via games are described. In the following description, for purposes of explanation, numerous specific details are set forth in order to provide a thorough understanding of example embodiments. It will be evident, however, to one skilled in the art that the present invention may be practiced without these specific details.

According to various example embodiments, a social network interaction gaming system is configured to enable members to learn more about their social network, and to interact to a greater extent with their social network, in a fun, interesting, and entertaining manner. For example, as described herein, a social network interaction gaming system is configured to present a member with questions in the form of a game or a quiz, where the questions may pertain to content items, members, entities, etc., associated with their social network. For example, the system may ask questions such as "which of the following members went to the same high school as you", "which of the following members is a board member at company XYZ", "which of the following members has being most endorsed for the skill of HTML", "which of the following companies has the highest stock price", "which one of the following universities has the largest endowment", "which of the following groups has the most members", and so on. Moreover, the system enables the member currently viewing and playing the game (hereinafter a "viewing member") to interact with various content items, members, and entities that are the subject of the game that they are playing or just played. Thus, the member is more likely to learn about and interact with their social network via such games and quizzes.

Figure 1:
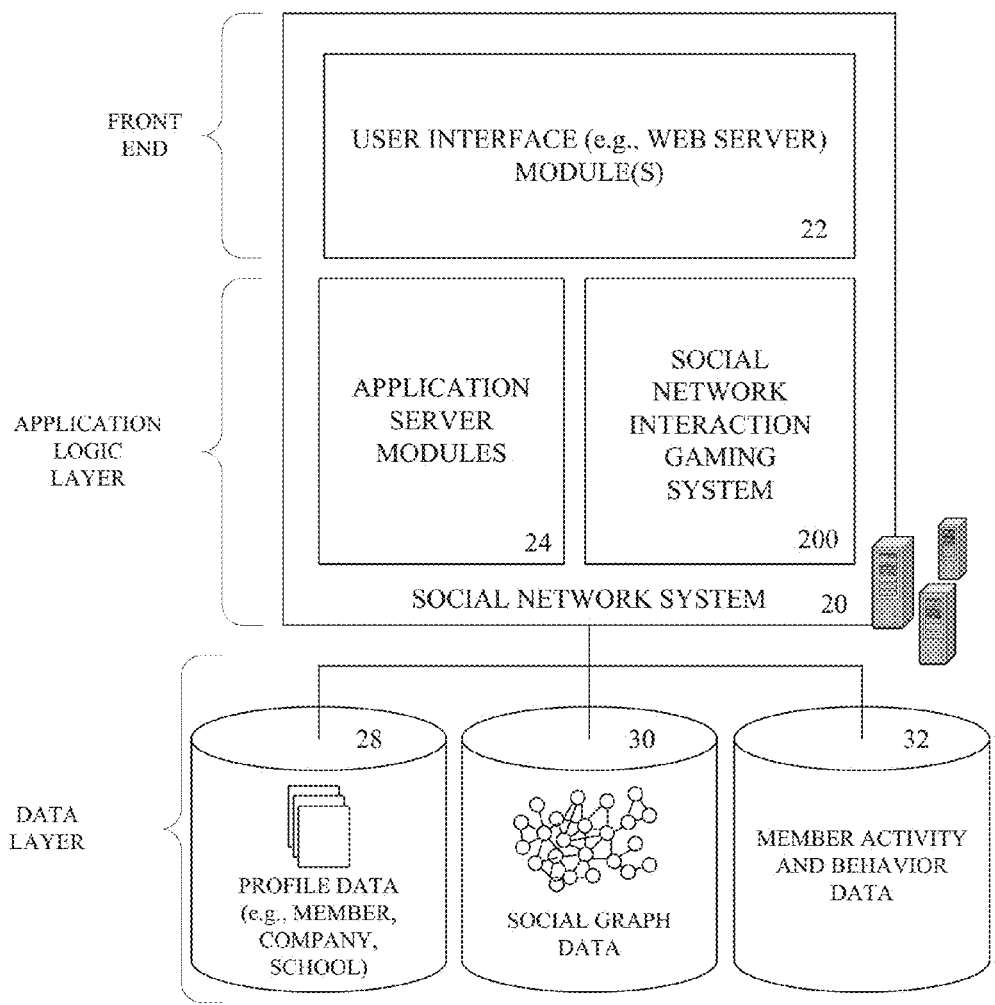
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32.

With some embodiments, the social network system 20 includes what is generally referred to herein as a social network interaction gaming system 200. The social network interaction gaming system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content-hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phones, or tablet computing devices) having a mobile operating system.

Figure 2:
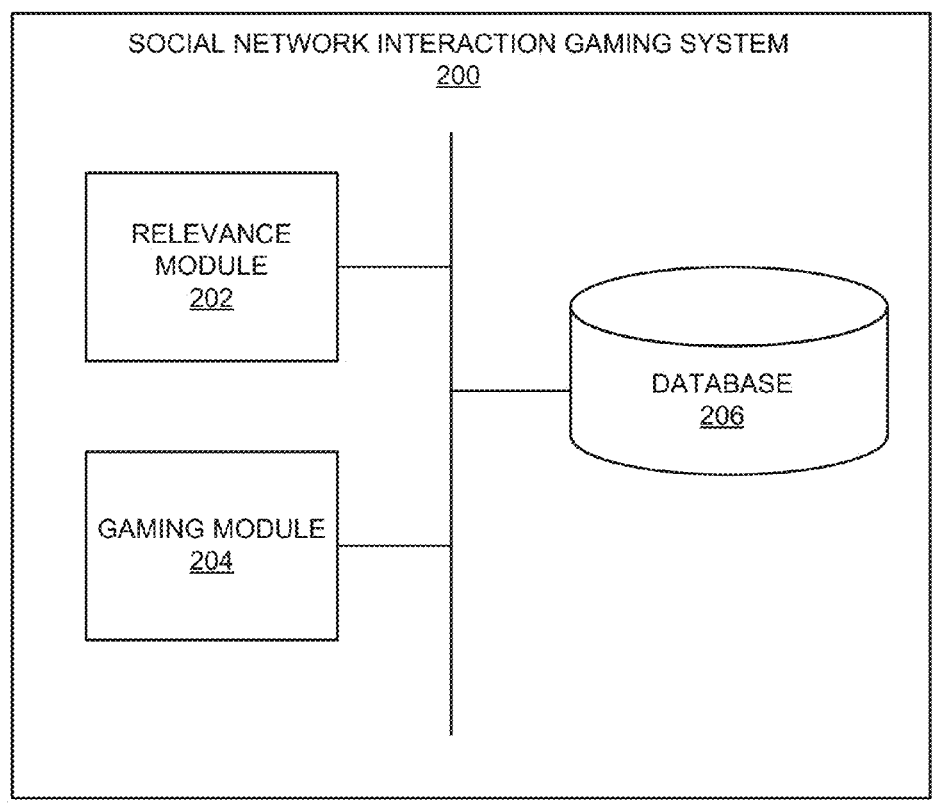
FIG. 2 is a block diagram of an example system, according to various embodiments.

Turning now to FIG. 2, a social network interaction gaming system 200 includes a relevance module 202, a gaming module 204, and a database 206. The modules of the social network interaction gaming system 200 may be implemented on or executed by a single device such as a social network interaction gaming device, or on separate devices interconnected via a network. The aforementioned social network interaction gaming device may be, for example, one or more client machines or application servers. The operation of each of the aforementioned modules of the social network interaction gaming system 200 will now be described in greater detail below.

As described herein, the relevance module 202 is configured to identify content items (e.g., articles, news stories, publications, etc.) or entities associated with an online social network service (e.g., members, job postings, group entities, school entities, influencer entities, company entities, etc.), that may be relevant to a member of the online social network service. For example, the relevance module 202 may infer that a content item or entity is of interest to the member, and/or that the member is likely to interact with this content item or entity, based on member profile attributes of the member, based on historical member interaction data of the member (e.g., describing how the member has previously interacted with content, entities, websites, etc., associated with the online social network service), based on member e-mail history of the member (e.g., indicating the member's use and interactions with e-mails and other messages), and so on.

The entities described herein may be any online entity associated with an online social network service. Examples of an entity associated with an online social network service LinkedIn® include a member or a member profile page associated therewith, a job posting or a job posting page associated therewith, a company entity or a company page associated therewith, a group entity or a group page associated therewith, an educational (e.g., University or school) entity and/or an educational page associated therewith, an influencer entity or an influencer page associated therewith, and so on. The content items described herein may be any online content item, such as a content item associated with an online social network service. An example of a content item includes a news item, an article, or a publication posted in a content feed associated with an online social network service such as LinkedIn®. Other examples of content items include media (e.g., videos, images, etc.), slideshows, presentations, documents, webpages, and so on. Content items include any products, features, or webpages associated with an online social network service, such as a home page, content feed, and various webpages associated with various entities described above (e.g., a member profile page, a job posting page, a company page, a group page, an educational page, an influencer profile page, and so on). As described herein, influencers are members of an online social network service (e.g., LinkedIn®) classified as influential members or having a status as influential members.

After determining that a particular content item or entity is relevant to the member, the gaming module 204 may then generate a game or quiz (including a question and candidate answers), based on this content item or entity. For example, the gaming module 204 may access stored attribute-value pairs associated with a content item, including attributes such as title, author, keywords, abstract, length, received social activity signals (e.g., views, likes, shares, comments, follows, etc.), attributes of members that have interacted with the content item, and so on. Such attribute-value pairs may be stored locally at, for example, the database 206 illustrated in FIG. 2, or may be stored remotely at a database, data repository, storage server, etc., that is accessible by the gaming module 204 via a network (e.g., the Internet). The gaming module 204 may then generate a question based on these attribute-value pairs. For example, given the attribute-value pair (shares, 6,000,000) associated with a particular article A, the gaming module 204 may generate a question such as "how many shares has this article received", based on the attribute in the attribute-value pair. For example, the gaming module 204 may insert the attribute ("shares") into a question template such as "how many [attribute] has this article received". The gaming module 204 may then generate a correct answer ("6,000,000") based on the value in the attribute-value pair. The gaming module 204 may generate false answers based on incorrect values (e.g., 5, 100, 2000, etc.) distinct from the value in the attribute-value pair. Alternatively, the gaming module 204 may utilize both the attribute and the value in the attribute-value pair to generate a question, such as "which one of these articles has been shared 6 million times", and may generate a correct answer ("article A") based on the title of the content item. The gaming module 204 may generate false answers based on alternative titles (e.g., titles of other content items).

Figure 3:
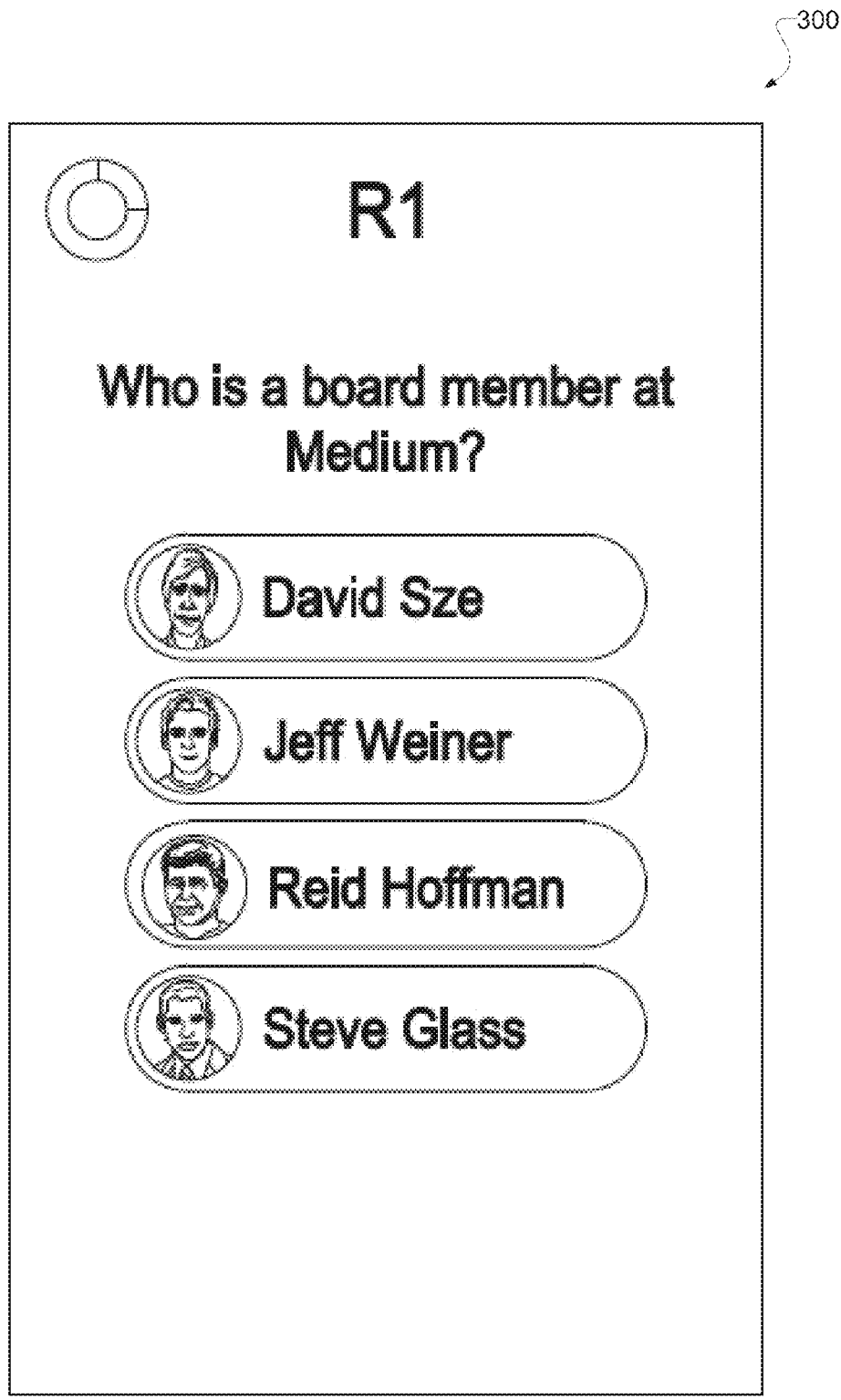
FIG. 3 illustrates an example portion of a user interface, according to various embodiments.

Similarly, the gaming module 204 may access stored attribute-value pairs associated with various entities, including member profile attributes associated with members (e.g., name, title, industry, company, education, skills, etc.), job attributes associated with job postings (e.g., job title, company, location, required skills, job summary, etc.), group attributes associated with the group entities (e.g., group name, membership size, moderator/leader identification information, attributes of group members, etc.), company attributes associated with company entities (e.g., company name, industry, company size, company location, products, services, attributes of employees, etc.), educational attributes associated with educational entities (e.g., name, location, courses, attributes of staff and students, etc.), influencer attributes associated with LinkedIn® influencers (e.g., member profile attributes of the influencer, etc.). Based on such attribute-value pairs, the gaming module 204 may generate the game questions and game answers, as described above. For example, FIG. 3 illustrates an exemplary user interface 300 that displays a game question associated with a game that is generated by the gaming module 204. For example, the relevance module 202 may have determined that the company entity "Medium" is relevant to a current viewing member, and thus the gaming module 204 has generated a game question, correct game answer (e.g., "David Sze") and alternative incorrect game answers, based on a board member of this group entity.

According to various example embodiments, after the member submits an answer to the game, the gaming module 204 will display the result and/or the correct answer. Moreover, the gaming module 204 enables the member to interact with the content item or entity that was the subject of the game. For example, the gaming module 204 may allow the member to view, like, share, or comment on the content item, follow a entity, post a message on the wall/webpage of a relevant entity, join a relevant group, apply for a relevant job, apply to a relevant school, send a message to a relevant member, endorse a relevant member for a skill, connect to a relevant member, and so on. For example, after the member selects one of the game answers illustrated in the user interface 300 in FIG. 3, the gaming module 204 may display the user interface 400 in FIG. 4 that displays a game result 401 (e.g., "Correct!", and the current member score "10"). Moreover, the user interface 400 provides the current viewing member with further background information or context regarding the correct answer choice and why it is correct, as well as other attributes of an entity (e.g., member, school, company, etc.) that is the subject of the correct answer (see 402-404). Moreover, the user interface 400 enables the current viewing member to follow the company entity "Medium" by selecting the "Follow Medium" button 405. Moreover, if the viewing member selects the "Next" button 406, the viewing member may advance to another question in the game.

Figure 5:
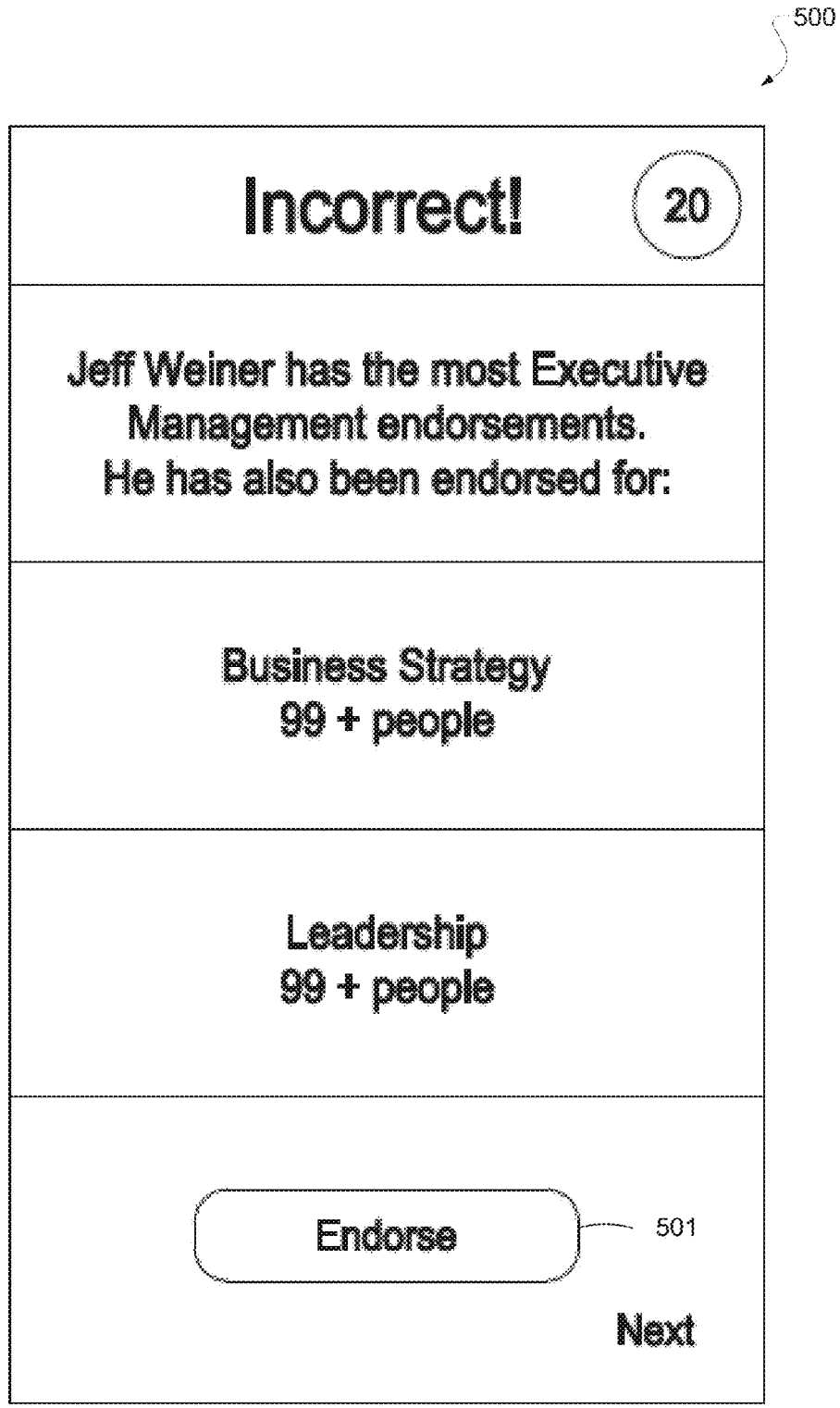
FIG. 5 illustrates an example portion of a user interface, according to various embodiments.

In some embodiments, even if the member answers a question incorrectly, the gaming module 204 will display the correct answer, along with relevant background and contextual information as described above, so that the current viewing member may still learn about the social network. For example, the user interface 500 in FIG. 5 displays a game result when a member incorrectly answers the question "which of the following members has the most executive management endorsements". Even though the current viewing member answered incorrectly, the correct answer is displayed together with further background information or context regarding the correct answer choice and why it is correct. Moreover, the current viewing member is still enabled to interact with the relevant entity associated with the correct answer (e.g., by endorsing the member Jeff Weiner by clicking the "Endorse" button 501).

Figure 6:
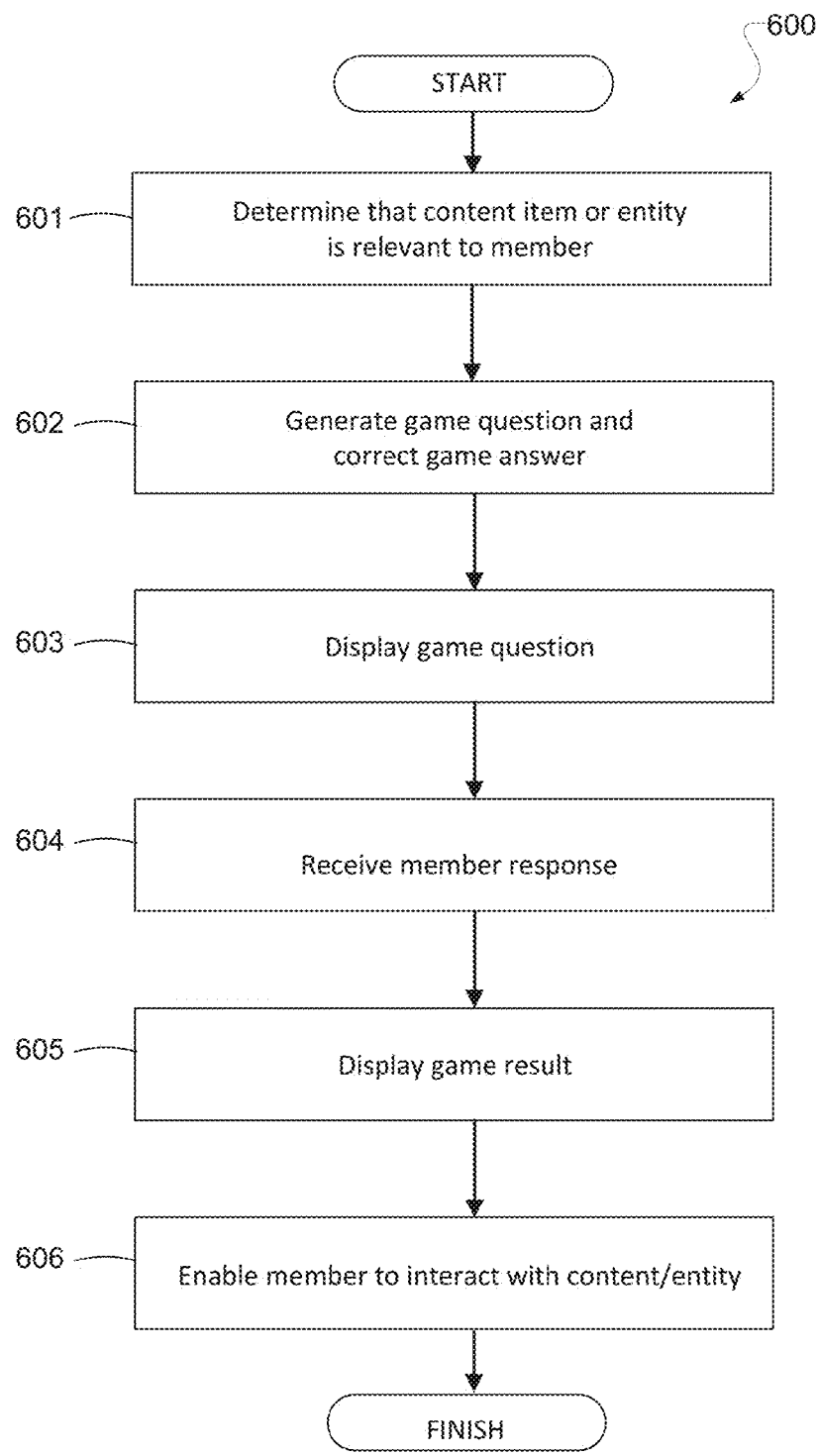
FIG. 6 is a flowchart illustrating an example method, according to various embodiments.

FIG. 6 is a flowchart illustrating an example method 600, consistent with various embodiments described above. The method 600 may be performed at least in part by, for example, the social network interaction gaming system 200 illustrated in FIG. 2 (or an apparatus having similar modules, such as one or more client machines or application servers). In operation 601, the relevance module 202 determines, based on at least one of stored member profile attributes and historical interaction data associated with a member of an online social network service, that a content item or entity associated with the online social network service is relevant to the member. In operation 602, the gaming module 204 generates an online game including a game question and one or more candidate answers (including a correct game answer and false answers), based on the content item or entity identified in operation 601. In operation 603, the gaming module 204 displays to the member, via one or more user interfaces, the game question (as well as one or more candidate answers) generated in operation 602. In operation 604, the gaming module 204 receives, via the one or more user interfaces, a member response to the displayed game question (e.g., the member selecting on one of the candidate answers). In operation 605, the gaming module 204 displays a game result, based on the received member response and the correct game answer. In operation 606, the gaming module 204 enables, via the one or more user interfaces, the member to interact with the content item or entity identified in operation 601. It is contemplated that the operations of method 600 may incorporate any of the other features disclosed herein. Various operations in the method 600 may be omitted or rearranged, as necessary.

Figure 7:
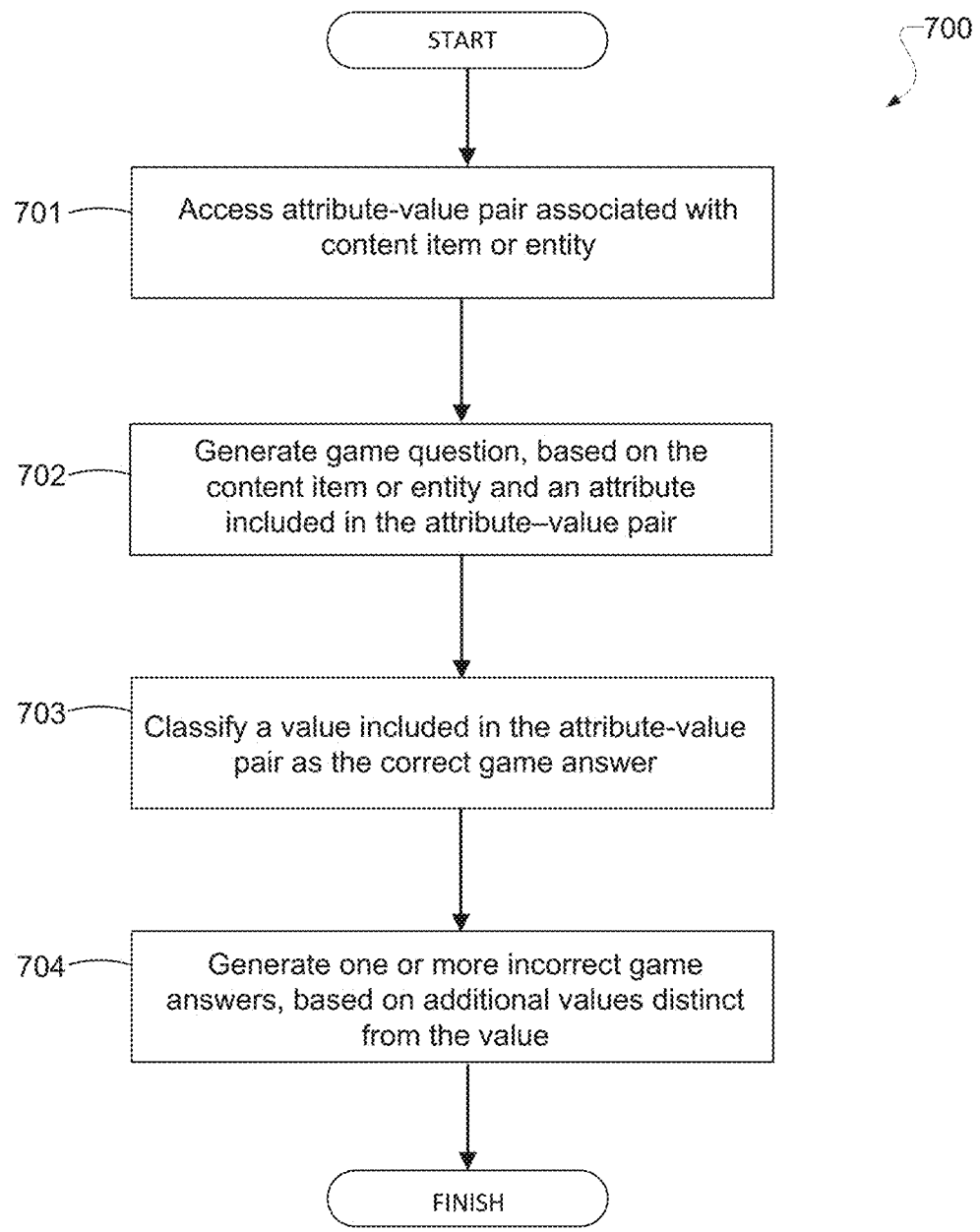
FIG. 7 is a flowchart illustrating an example method, according to various embodiments.

FIG. 7 is a flowchart illustrating an example method 700 for generating an online game, consistent with various embodiments described above. The method 700 may be performed at least in part by, for example, the social network interaction gaming system 200 illustrated in FIG. 2 (or an apparatus having similar modules, such as one or more client machines or application servers). In some embodiments, the method 700 may correspond to operation 602 in FIG. 6. In operation 701, the gaming module 204 accesses stored information associated with a content item or entity, the information corresponding to an attribute-value pair. In operation 702, the gaming module 204 generates a game question based on information identifying the content item or entity and an attribute included in the attribute-value pair. In operation 703, the gaming module 204 classifies a value included in the attribute-value pair as a correct game answer. In operation 704, the gaming module 204 generates one or more incorrect game answers based on additional values distinct from the value in the attribute-value pair. It is contemplated that the operations of method 700 may incorporate any of the other features disclosed herein. Various operations in the method 700 may be omitted or rearranged, as necessary.

Figure 8:
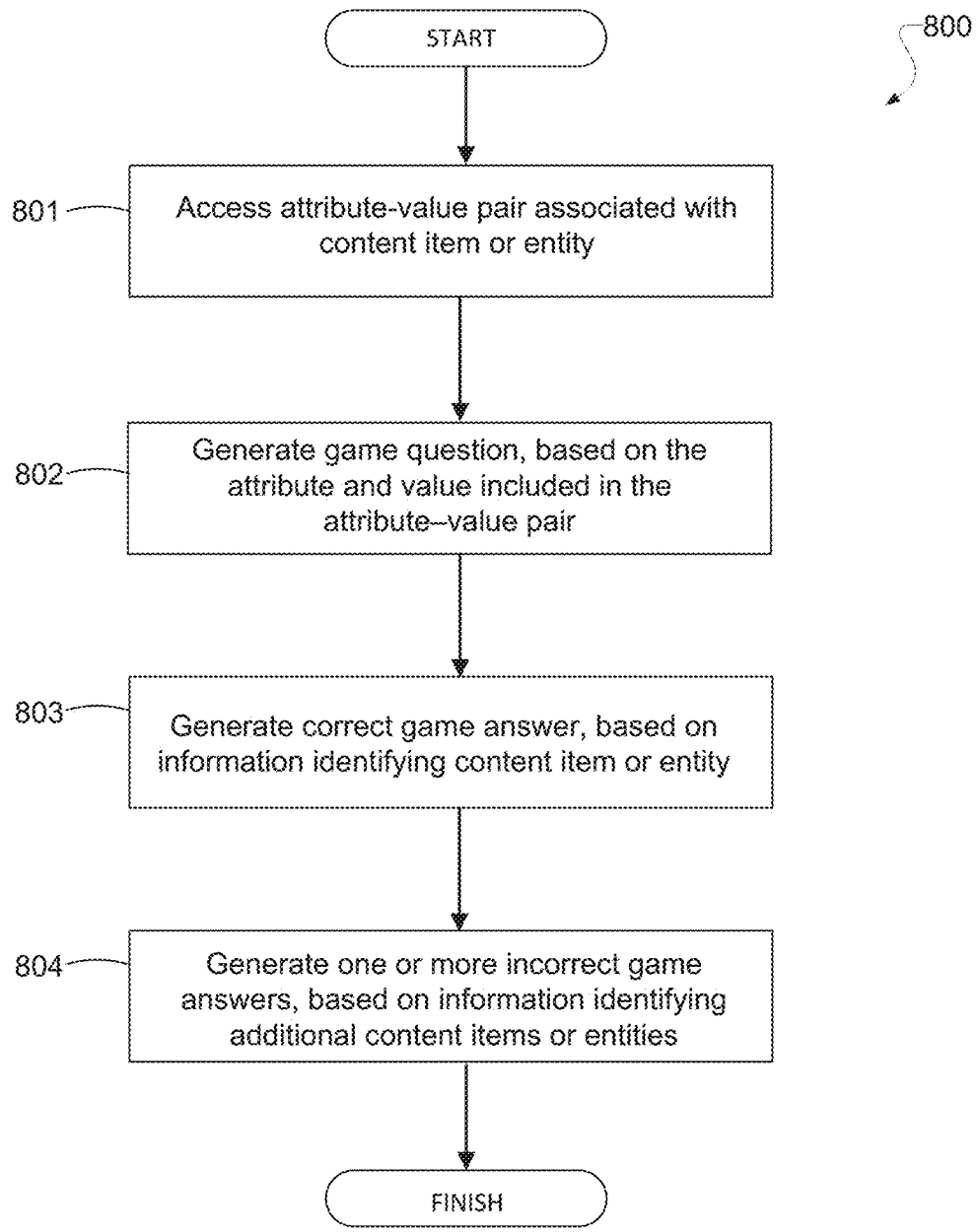
FIG. 8 is a flowchart illustrating an example method, according to various embodiments.

FIG. 8 is a flowchart illustrating an example method 800 for generating an online game, consistent with various embodiments described above. The method 800 may be performed at least in part by, for example, the social network interaction gaming system 200 illustrated in FIG. 2 (or an apparatus having similar modules, such as one or more client machines or application servers). In some embodiments, the method 800 may correspond to operation 602 in FIG. 6. In operation 801, the gaming module 204 accesses stored information associated with a content item or entity, the information corresponding to an attribute-value pair. In operation 802, the gaming module 204 generates a game question based on an attribute and a value included in the attribute-value pair. In operation 803, the gaming module 204 classifies information identifying the content item or entity as a correct game answer. In operation 804, the gaming module 204 generates one or more incorrect game answers based on information identifying additional content items or additional entities distinct from the content item or entity associated with the attribute-value pair. It is contemplated that the operations of method 800 may incorporate any of the other features disclosed herein. Various operations in the method 800 may be omitted or rearranged, as necessary.

In some embodiments, the relevance module 202 may identify another member that is relevant to the current viewing member by, for example, accessing stored member profile attributes and/or historical interaction data associated with the member (e.g., historical log data indicating how the member has interacted (e.g., clicks or views) with the website content or email content of the social network). The relevance module 202 may then generate, based on the stored member profile attributes and/or the historical interaction data, a confidence score (e.g., number within a range such as 0 to 1, 0 to 10, 0 to 100, etc.) indicating a likelihood that the content item or entity is relevant to the member. The relevance module 202 may then determine that the content item or entity is relevant to the member, based on the generated confidence score (e.g., if the generated confidence score is greater than a predetermined threshold). In the case of entities corresponding to other members, the relevance module 202 may optionally restrict the candidates for the relevant entity to only member connections of the current viewing member (or member connections of a particular degree, such as first degree or second degree connections). The relevance module 202 may generate the confidence score using any known technique. For example, the relevance module 202 may train a computer-based prediction model (e.g., a statistical machine learning model), based on various feature data (e.g., member profile features, site interaction data, e-mail interaction data, etc.) associated with one or more members of the online social network service, in order to predict a likelihood (e.g., the aforementioned confidence score) that a particular member has an interest or preference in interacting with a particular content item or entity. Examples of prediction models are well known and include a logistic regression model, a gradient-boosted machine (GBM) model, a Naïve Bayes model, a support vector machines (SVM) model, a decision trees model, and a neural network model, and will not be described in greater detail herein.

In some embodiments, the relevance module 202 may identify a particular content item or entity that is relevant to the current viewing member by, for example, determining that one or more attributes associated with the member match one or more attributes associated with the relevant content item or entity. For example, the relevance module 202 may determine that a particular job posting entity is relevant to the current viewing member because attributes associated with the job posting entity (e.g., job title, industry, required skills, required education, location, etc.) match attributes associated with the current viewing member (e.g., job title, industry, required skills, required education, location, etc.). As another example, the relevance module 202 may determine that a particular group entity is relevant to the current viewing member because attributes associated with the group entity (e.g., group title, group subject keywords, names in group membership list, etc.) match attributes associated with the current viewing member (e.g., company, school, job title, industry, skills, location, names of member connections of the member, etc.). As another example, the relevance module 202 may determine that a particular educational entity is relevant to the current viewing member because an educational attribute associated with the viewing member matches the title of the educational entity (or matches the educational attributes of a predetermined number or predetermined portion of followers of the educational entity). As another example, the relevance module 202 may determine that a particular company entity is relevant to the current viewing member because a company attribute associated with the viewing member matches the title of the company entity (or matches the company attributes of a predetermined number or predetermined portion of followers of the company entity).

In some embodiments, the relevance module 202 may determine a job entity that is relevant to the current viewing member by predicting a job that the current viewing member may be interested in. For example, the relevance module 202 may identify other jobs that other members with similar attributes have applied to. Instead or in addition, the relevance module 202 may identify other jobs held by other members that used to share similar attributes with the current viewing member. For example, if the viewing member has the current title of "assistant manager", then the relevance module 202 may identify not only the jobs associated with a similar job title attribute of "assistant manager", but the relevance module 202 may also determine that other members that were previously associated with the title of "assistant manager" have ultimately obtained positions with the title of "manager". Thus, the relevance module 202 may identify job postings associated with the job title attributes of "manager" as job entities that may be relevant to the current viewing member.

In some embodiments, the relevance module 202 may identify a particular entity corresponding to a second member of the online social network service that is relevant to the current viewing member by, for example, determining that the current viewing member and the second member have a member connection strength score satisfying a predetermined threshold. For example, the relevance module 202 may access or generate member connection strength scores indicating the strength of the connection between two members (e.g., based on how much they interact with each other (via messages or posts), or based on how much they interact with each other's content (such as via profile views or views of posts), or based on how many member connections they share, or based on how many member profile attributes they share, or based on similar interactions (such as clicks or views) with online content such as a website associated with an online social network service, etc.). The relevance module 202 may then select a subset of members having member connection strength scores falling within a predetermined range, and select the relevant member from that subset. For example, the relevance module 202 may select a subset of members having very high member connection strength scores (e.g., >0.8, out of the range 0 to 1) in order to identify the members having the strongest connection to the current viewing member. As another example, the relevance module 202 may select a subset of members having intermediate member connection strength scores (e.g., between 0.5-0.8, out of the range 0 to 1) in order to identify members having an intermediate connection to the current viewing member. This may be beneficial since the current viewing member may be less intrigued or interested in learning about their closest friends. In some embodiments, the relevance module 202 may optionally restrict the candidates for the second member to only member connections of the current viewing member (or member connections of a particular degree, such as first degree or second degree connections).

In some embodiments, the relevance module 202 may identify a particular entity corresponding to a second member of the online social network service that is relevant to the current viewing member by, for example, determining that the current viewing member and the second member have a member similarity score satisfying a predetermined threshold, and selecting the relevant member from that subset. For example, the relevance module 202 may access or generate member similarity scores indicating how similar two members are (e.g., based on how many member profile attributes they share, or based on similar interactions (such as clicks or views) with online content such as a website associated with an online social network service, etc.). The relevance module 202 may then select a subset of members having member similarity scores falling within a predetermined range. For example, the relevance module 202 may select a subset of members having very high similarity scores (e.g., >0.8, out of the range 0 to 1) in order to identify the most similar members to the current viewing member. As another example, the relevance module 202 may select a subset of members having intermediate similarity scores (e.g., between 0.5-0.8, out of the range 0 to 1) in order to identify members somewhat similar to the current viewing member. This may be beneficial since the current viewing member may be less intrigued or interested in learning about members that are just like them. In some embodiments, the relevance module 202 may optionally restrict the candidates for the second member to only member connections of the current viewing member (or member connections of a particular degree, such as first degree or second degree connections).

In some embodiments, the relevance module 202 may identify a particular entity corresponding to a second member of the online social network service that is relevant to the current viewing member by, for example, determining that the member and the second member have not communicated (e.g., by posting on each other's walls, sending messages to each other via the social network, etc.) during a predetermined time interval (e.g., the past day, week, month, six months, year, etc.). In some embodiments, the relevance module 202 may optionally restrict the candidates for the second member to only member connections of the current viewing member (or member connections of a particular degree, such as first degree or second degree connections).

In some embodiments, the relevance module 202 may identify a particular entity corresponding to a second member of the online social network service that is relevant to the current viewing member by, for example, accessing the member's electronic calendar information, appointment information, email information, event information, etc., in order to identify a second member that the viewing member will likely meet that day or that week (e.g., a second member included as an invitee in a scheduled meeting). In some embodiments, the relevance module 202 may optionally restrict the candidates for the second member to only member connections of the current viewing member (or member connections of a particular degree, such as first degree or second degree connections).

In some embodiments, the relevance module 202 may identify a particular entity corresponding to a second member of the online social network service that is relevant to the current viewing member by, for example, determining that the second member is associated with a recent (e.g., during the past day, week, month, etc.) network update event (e.g., changing jobs, a work anniversary, a birthday, getting engaged or married, having a child, etc.) posted on a content feed of the online social network service. In some embodiments, the relevance module 202 may optionally restrict the candidates for the second member to only member connections of the current viewing member (or member connections of a particular degree, such as first degree or second degree connections).

Figure 9:
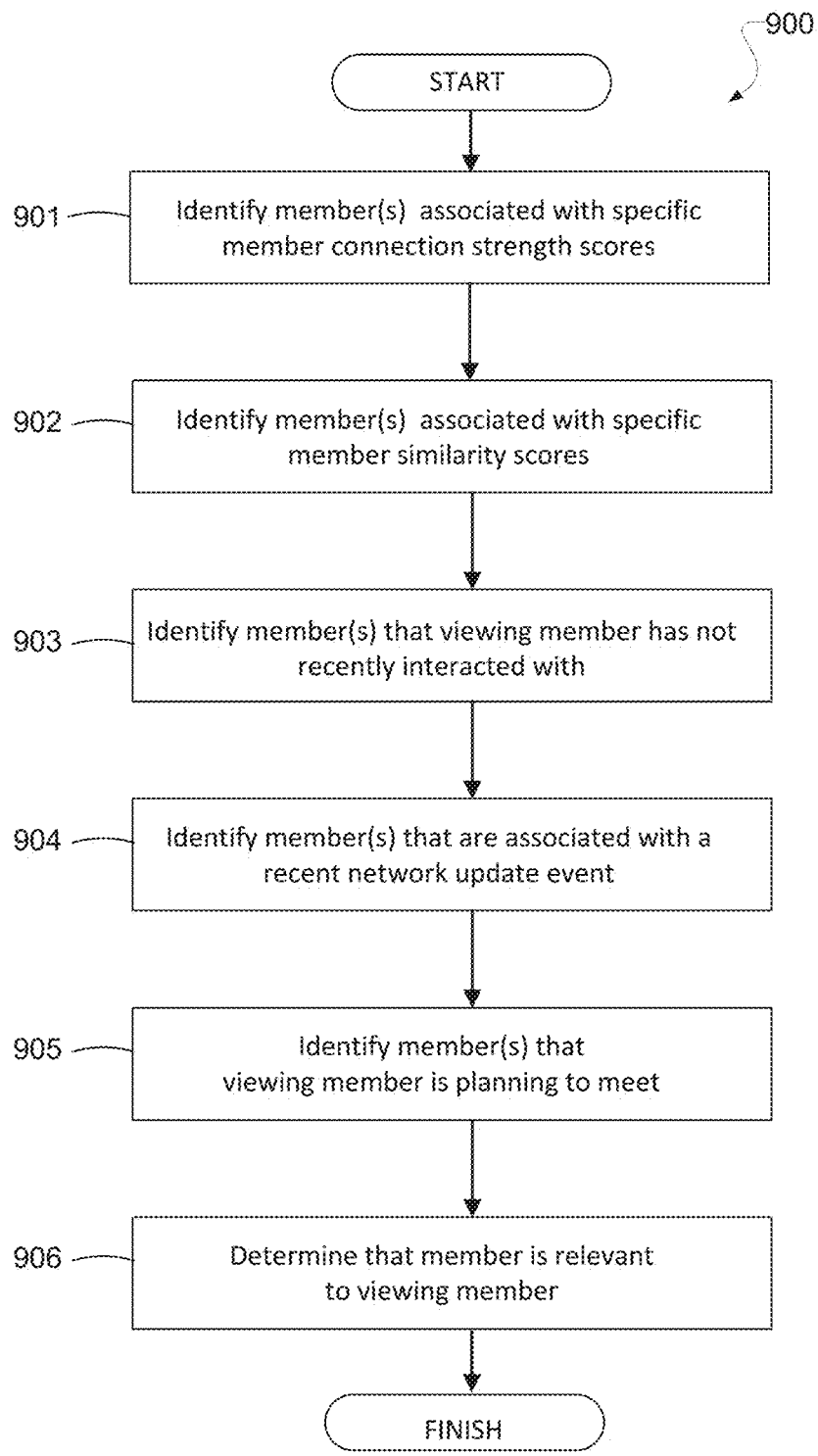
FIG. 9 is a flowchart illustrating an example method, according to various embodiments.

FIG. 9 is a flowchart illustrating an example method 900 for identifying another member that is relevant to a current viewing member, consistent with various embodiments described above. The method 900 may be performed at least in part by, for example, the social network interaction gaming system 200 illustrated in FIG. 2 (or an apparatus having similar modules, such as one or more client machines or application servers). In operation 901, the relevance module 202 identifies member(s) associated with specific member connection strength scores. In operation 902, the relevance module 202 identifies member(s) associated with specific member similarity scores. In operation 903, the relevance module 202 identifies member(s) that the current viewing member has not recently interacted with. In operation 904, the relevance module 202 identifies member(s) that are associated with a recent network update event. In operation 905, the relevance module 202 identifies member(s) that current viewing member is planning to meet (e.g., based on calendar information of the current viewing member). In operation 906, the relevance module 202 identifies a member that is relevant to the current viewing member, based on any of the members identified in operations 901-905. It is contemplated that the operations of method 900 may incorporate any of the other features disclosed herein. Various operations in the method 900 may be omitted or rearranged, as necessary.

Figure 10:
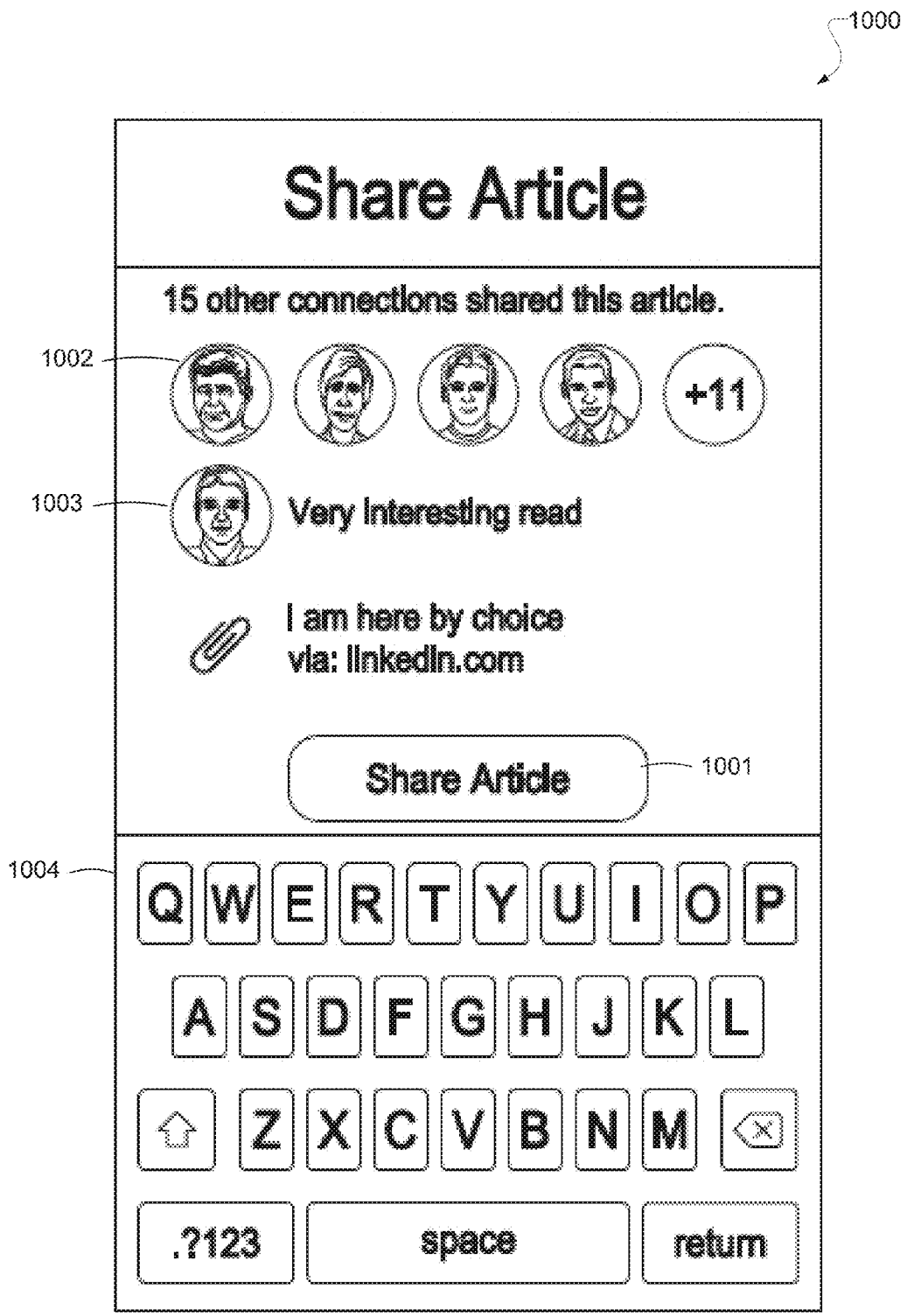
FIG. 10 illustrates an example portion of a user interface, according to various embodiments.

As described above, the gaming module 204 may enable the member to interact with the relevant content item or entity that is the subject of a game question after the member answers that question. For example, if the relevance module 202 determines that a particular content item is relevant to a member, then the gaming module 204 may enable the member to interact with the content item by displaying a user interface element to enable the member to view, like, share, or comment on the content item. For example, FIG. 10 illustrates an exemplary user interface 1000 that enables a member to share (e.g., in their member profile page or in a content feed associated with an online social network service) a particular article "I am here by choice" by selecting the "Share Article" button 1001. The user interface 1000 also identifies other members of the social network (e.g., member connections of the viewing member) in the user interface area 1002 that have shared this particular article (e.g., to encourage the viewing member to share the article). The user interface 1000 also enables the member to post a comment 1003 in connection with the shared article 1002, such as by typing into a keypad user interface portion 1004.

Figure 4:
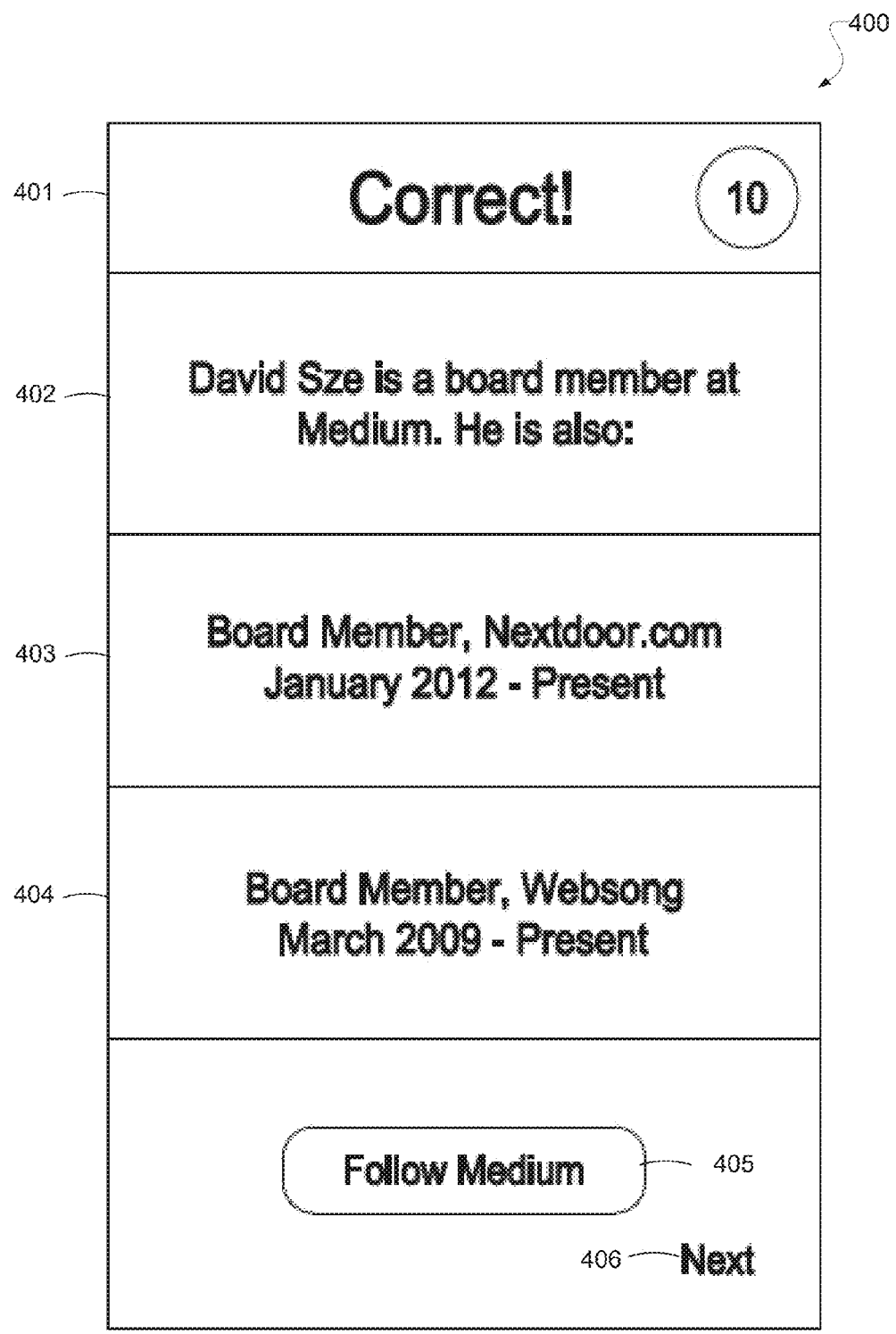
FIG. 4 illustrates an example portion of a user interface, according to various embodiments.

As another example, if the relevance module 202 determines that the particular entity (e.g., another member, a job posting, a group entity, a company entity, an influencer entity, an educational entity, etc.) is relevant to the member, the gaming module 204 may enable the member to interact with the entity by displaying a user interface element enabling the member to follow the entity (e.g., see the "Follow [Entity]" button 405 in the user interface 400 in FIG. 4). In some embodiments, the gaming module 204 may first determine that the current viewing member is not already following the entity, before displaying such a "Follow" user interface element. As another example, the gaming module 204 may enable the member to interact with the entity by displaying a keypad and a "Post" button enabling the member to type and post a message on a profile page associated with the relevant entity (such as a member profile page, a job posting page, a company page, a group page, an influencer profile page, an educational institution page, etc.). In some embodiments, the gaming module 204 may pre-generate a draft message (e.g., "Can I join your group?") in the message preview area, so that the member can simply select a "Post" button to post the pre-generated draft message on the profile page associated with the relevant entity.

Figure 11:
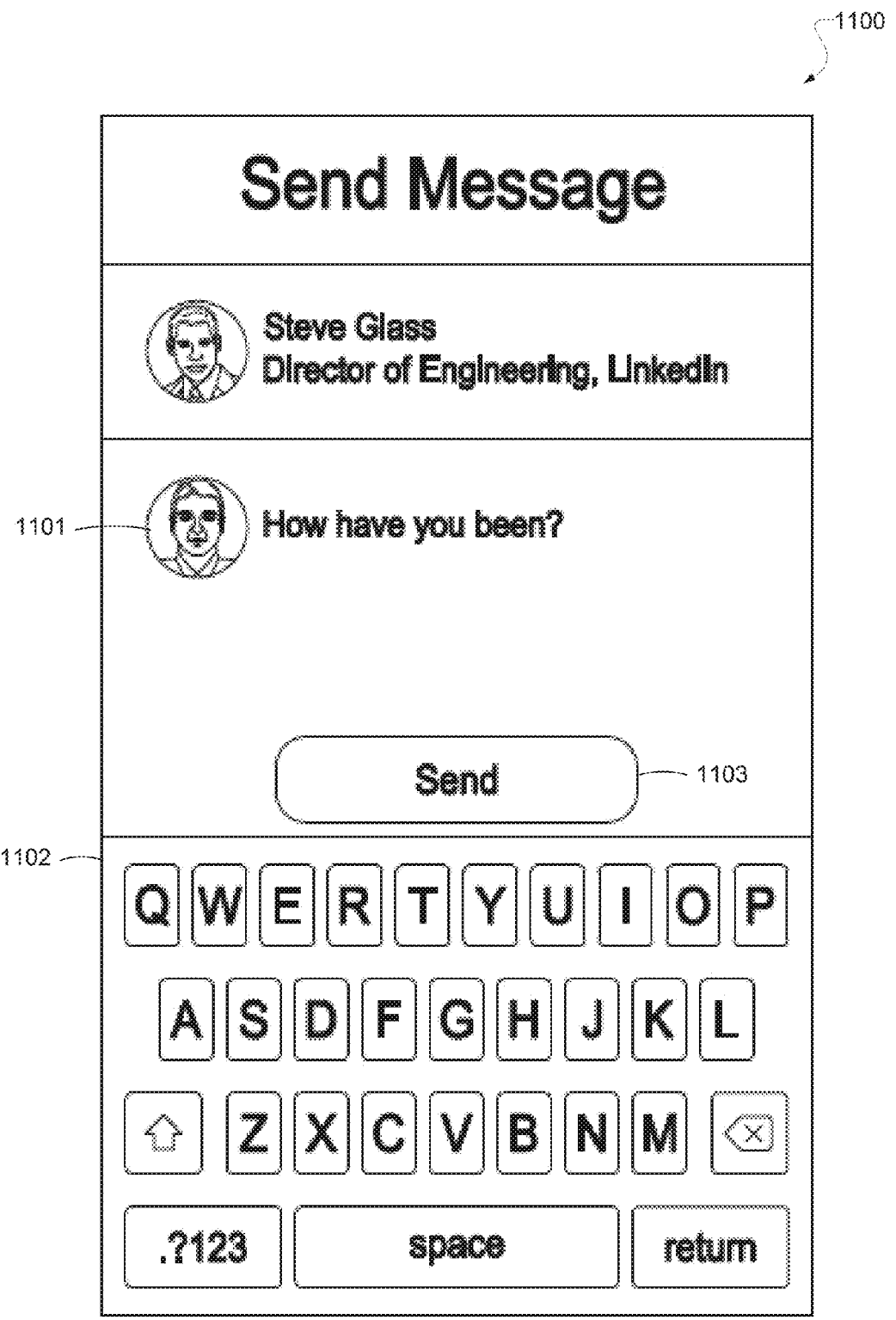
FIG. 11 illustrates an example portion of a user interface, according to various embodiments.

In some embodiments, if the relevance module 202 determines that a particular entity corresponding to another member of the social network service is relevant to the viewing member, then the gaming module 204 may enable the member to interact with the other member by displaying a message user interface enabling the member to transmit a message (e.g., e-mail, chat message, text message, social network message such as an LinkedIn® InMail®, etc.) to the other member. For example, FIG. 11 illustrates a message user interface 1100 that enables the member to generate a message in the message preview area 1101 (e.g., by typing in the keypad 1102) and by selecting the "Send" button 1103 to transmit the message. In some embodiments, the gaming module 204 may pre-generate a draft message (e.g., "How have you been?") in the message preview area 1101, so that the member can simply select the "Send" button 1103 to send the pre-generated draft message. As another example, the gaming module 204 may enable the member to interact with the other member by displaying a user interface element enabling the member to endorse the other member for a specific skill (e.g., see the "Endorse" button 501 in the user interface 500 in FIG. 5). As another example, the gaming module 204 may enable the member to interact with the other member by displaying a user interface element enabling the member to connect to the other member.

In some embodiments, if the relevance module 202 determines that a particular entity corresponding to a job posting/listing is relevant to the viewing member, then the gaming module 204 may enable the member to interact with the job posting/listing by displaying a user interface element enabling the member to save or apply for a job associated with the job posting. For example, the gaming module 204 may redirect the viewing member to an externally hosted job posting and/or utilize profile attributes of the member to automatically fill out an electronic application form for the job.

In some embodiments, the gaming module 204 may generate more intricate game questions and/or answers that the current viewing member may find more engaging, by identifying and including references to other attributes, contents, entities, etc., that may be shared by the current viewing member. For example, as described above, if the relevance module 202 identifies a particular group entity, company entity, or school entity that is relevant to the current viewing member, the gaming module 204 may generate questions based on generic attributes associated with these entities (e.g., "which one of these companies has the highest stock price", "which one of these schools has the largest endowment", etc.), as described above. However, the gaming module 204 may generate a more engaging question and answers by referencing other members of the online social network (e.g., member connections of the current viewing member), that are associated with member profile attributes matching these group entities, company entities, school entities, etc. For example, the gaming module 204 may generate a question such as "which one of your friends works at company XYZ" (where the correct answer corresponds to the appropriate member, and where the incorrect answers may correspond to other member connections of the member), or a question such as "your friend ABC went to undergrad at which of the following?" (where the correct answer corresponds to the appropriate school entity, and where the incorrect answer may correspond to other school entities). Thus, in some embodiments, the gaming module 204 may identify another member (e.g., a member connection of the current viewing member) that is associated with an attribute (e.g., company, school, etc.) matching an attribute associated with the underlying relevant content item or entity (e.g., a group entity, company entity, school entity, etc.). In this way, the gaming module 204 may generate the game question or correct game answer based on information identifying the other member. In such case, after the current viewing member answers the question, the gaming module 204 may enable the viewing member to interact not only with the relevant content item or entity, but also with the relevant member connection.

In some embodiments, if the relevance module 202 identifies a particular member as being relevant to a current viewing member (e.g., because the current viewing member is planning to meet the identified member), the gaming module 204 may generate more engaging question and answers by referencing other attributes of the identified member that may be shared by the current viewing member. For example, instead of a question such as "which one of your meeting participants has received the most endorsements" (which does not explicitly incorporate attributes of the identified relevant member that are shared by the current viewing member), the gaming module 204 may instead generate a question such as "which one of your meeting participants went to the same school as you?". In such case, after the current viewing member answers the question, the gaming module 204 may enable the viewing member to interact not only with the relevant member, but also with a corresponding entity (e.g., the shared school).

Figure 12:
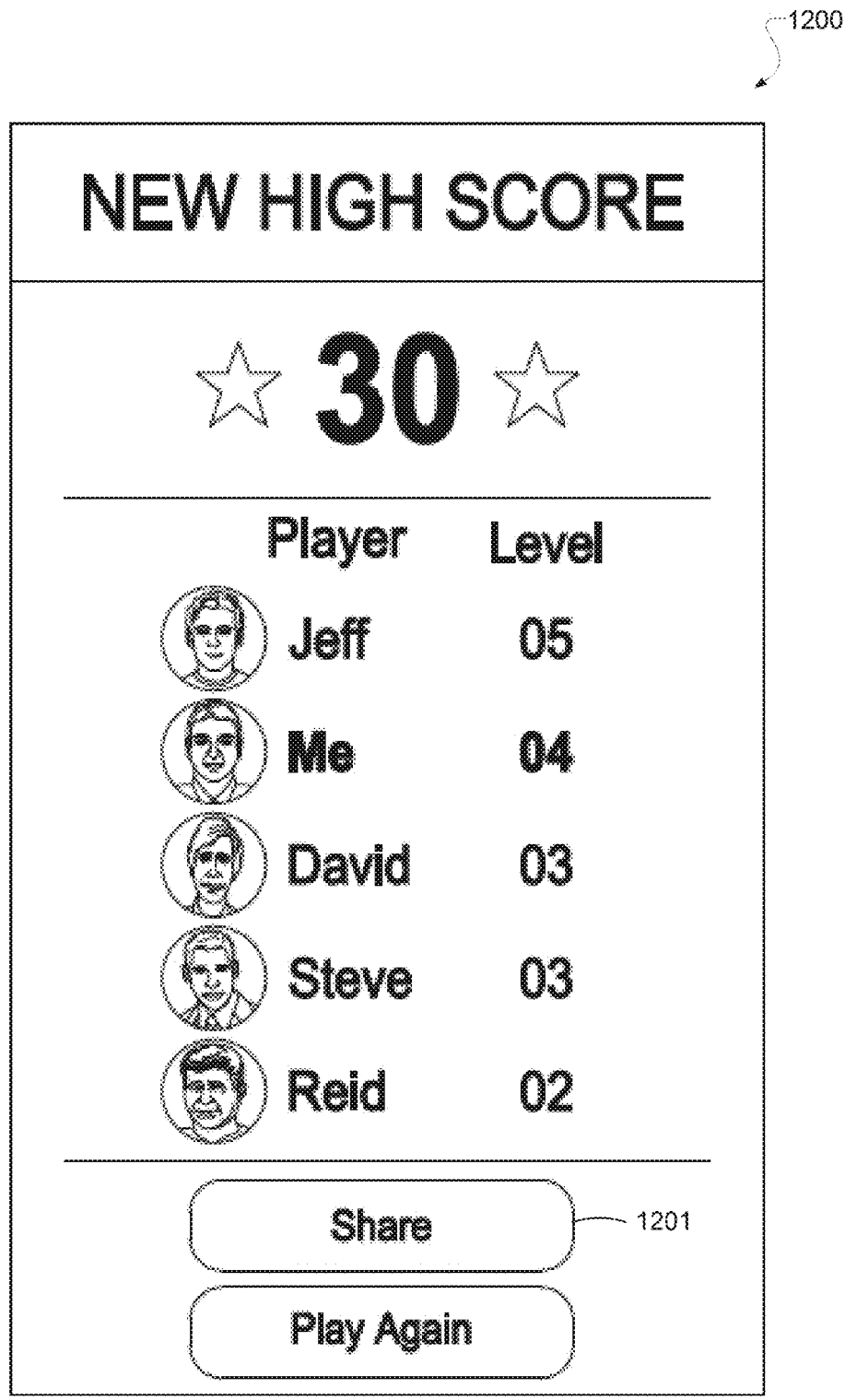
FIG. 12 illustrates an example portion of a user interface, according to various embodiments.
Figure 13:
FIG. 13 illustrates an example portion of a user interface, according to various embodiments.

In some embodiments, after a game result is displayed to a member (e.g., see user interface 1200 in FIG. 12, which displays a score and a comparison of the score with high scores obtained by others), the gaming module 204 may enable the member may share their score with their social network. For example, if the member selects the "Share" button 1201 illustrated in FIG. 12, then the gaming module 204 may display the user interface 1300 in FIG. 13 that enables the member to generate a message in the message preview area 1301 (e.g., by typing in the keypad 1302) and by selecting the "Share" button 1303 to transmit the message. In some embodiments, the gaming module 204 may pre-generate a draft message (e.g., "Check out my new high score!") in the message preview area 1301, so that the member can simply select the "Share" button 1303 to post the pre-generated draft message (e.g., to content feeds viewable by other members of the online social network service).

Example Mobile Device

Figure 14:
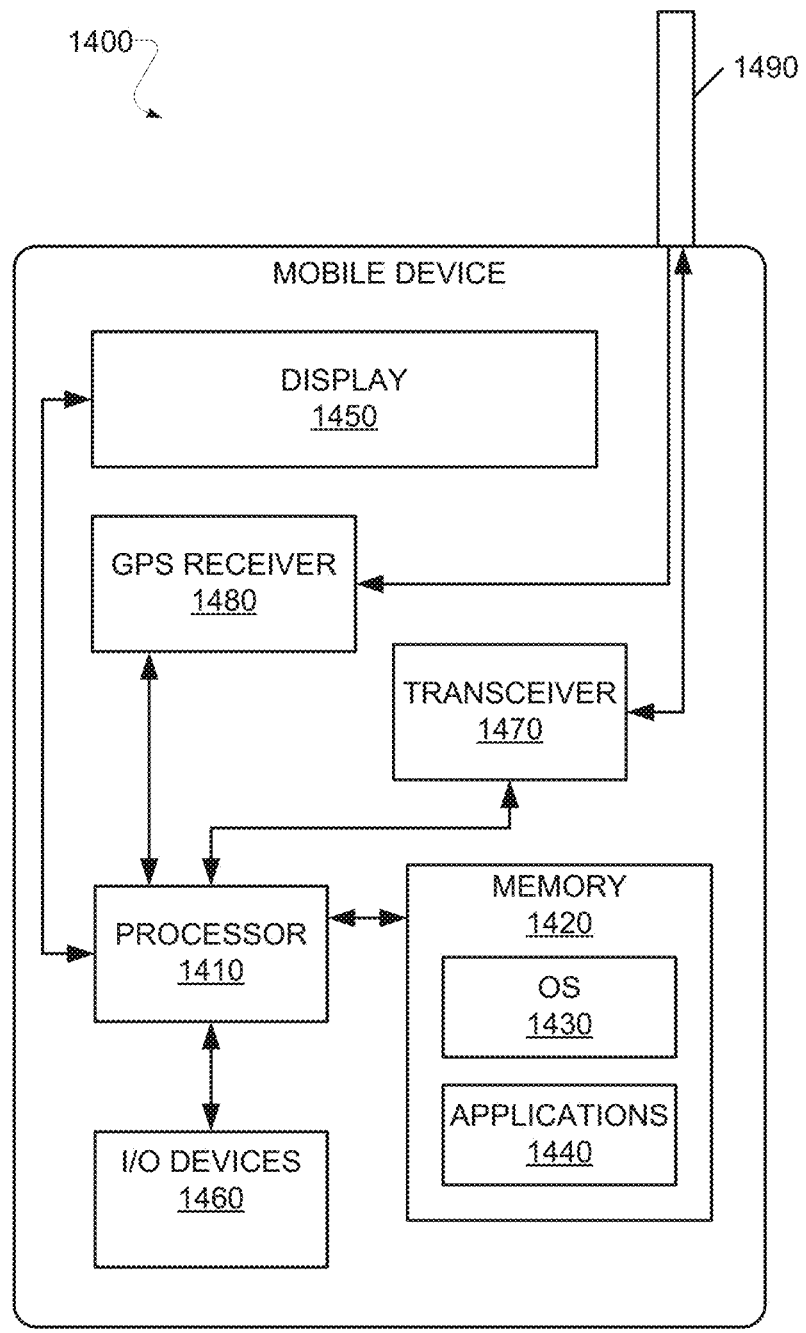
FIG. 14 illustrates an example mobile device, according to various embodiments.

FIG. 14 is a block diagram illustrating the mobile device 1400, according to an example embodiment. The mobile device may correspond to, for example, one or more client machines or application servers. One or more of the modules of the system 200 illustrated in FIG. 2 may be implemented on or executed by the mobile device 1400. The mobile device 1400 may include a processor 1410. The processor 1410 may be any of a variety of different types of commercially available processors suitable for mobile devices (for example, an XScale architecture microprocessor, a Microprocessor without Interlocked Pipeline Stages (MIPS) architecture processor, or another type of processor). A memory 1420, such as a Random Access Memory (RAM), a Flash memory, or other type of memory, is typically accessible to the processor 1410. The memory 1420 may be adapted to store an operating system (OS) 1430, as well as application programs 1440, such as a mobile location enabled application that may provide location based services to a user. The processor 1410 may be coupled, either directly or via appropriate intermediary hardware, to a display 1450 and to one or more input/output (I/O) devices 1460, such as a keypad, a touch panel sensor, a microphone, and the like. Similarly, in some embodiments, the processor 1410 may be coupled to a transceiver 1470 that interfaces with an antenna 1490. The transceiver 1470 may be configured to both transmit and receive cellular network signals, wireless data signals, or other types of signals via the antenna 1490, depending on the nature of the mobile device 1400. Further, in some configurations, a GPS receiver 1480 may also make use of the antenna 1490 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field-programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
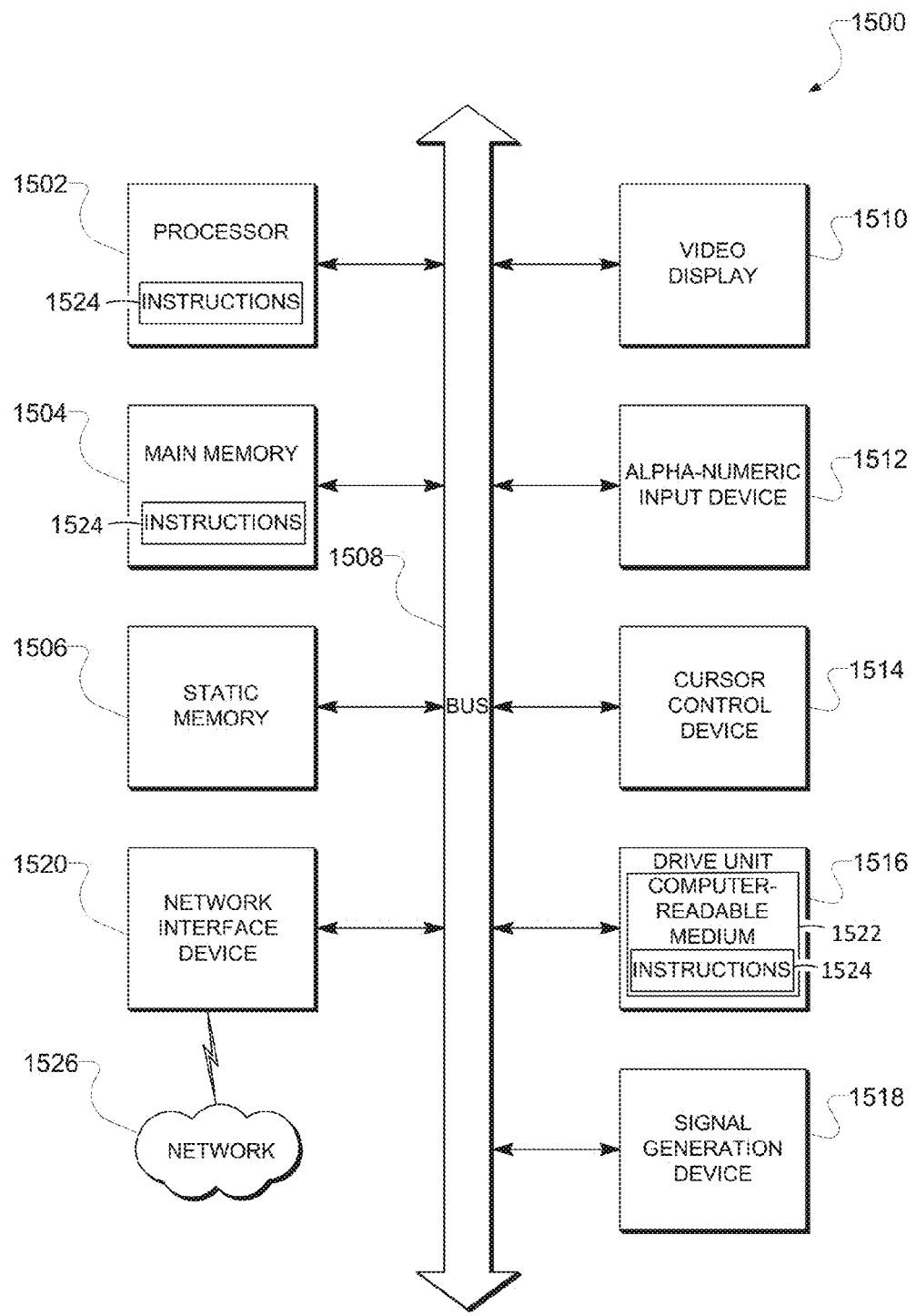
FIG. 15 is a diagrammatic representation of a machine in the example form of a computer system within which a set of instructions, for causing the machine to perform any one or more of the methodologies discussed herein, may be executed.

FIG. 15 is a block diagram of machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UI) navigation device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of instructions and data structures (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks: magneto-optical disks; and Compact Disc Read-Only Memory (CD-ROM) and Digital Versatile Disc Read-Only Memory (DVD-ROM) disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    determining, based on at least one of stored member profile attributes and historical interaction data associated with a member of an online social network service, that a second member associated with the online social network service is relevant to the member, the second member not being connected via the online social network service with the member, the determining performed by a relevance module containing a gradient-boosted machine used to calculate a confidence score indicating a likelihood that the second member is relevant to the member using a prediction model;
    generating a computer game based on the second member;
    displaying to the member, via one or more user interfaces, a first output of the computer game;
    receiving, via the one or more user interfaces, a member response to the first output of the computer game; and
    displaying, using one or more processors, a game result user interface that includes:
        a game result generated based on the received member response; and
        a user interface element displayed in conjunction with the game result, the user interface element configured to enable the member to connect via the online social network service with the second member in response to user selection of the user interface element.

2. The method of claim 1, wherein the generating of the computer game further comprises:
    accessing a stored information item associated with the second member, the information item corresponding to an attribute-value pair;
    generating the first output based on information identifying the second member and an attribute included in the attribute-value pair;
    classifying a value included in the attribute-value pair as a correct game answer; and
    generating one or more incorrect game answers based on additional values distinct from the value.

3. The method of claim 1, wherein the generating of the computer game further comprises:
    accessing a stored information item associated with the second member, the information item corresponding to an attribute-value pair;
    generating the first output based on an attribute and a value included in the attribute-value pair;
    classifying information identifying the second member as a correct game answer; and
    generating one or more incorrect game answers based on information identifying additional entities distinct from the second member.

4. The method of claim 1, wherein the determining that the second member is relevant further comprises:
    determining that one or more attributes associated with the member match one or more attributes associated with the second member.

5. The method of claim 1, wherein the determining that the second member is relevant further comprises:
    determining that the member and the second member have a member connection strength score satisfying a predetermined threshold.

6. The method of claim 1, further comprising:
identifying a member connection of the member that is associated with an attribute matching an attribute associated with the second member; and
generating the first output based on information identifying the member connection.

7. The method of claim 1, further comprising:
displaying a user interface element configured to enable the member to follow the second member.

8. The method of claim 1, further comprising:
displaying a user interface element configured to enable the member to post a message on a profile page associated with the second member.

9. The method of claim 1, further comprising:
displaying a message user interface configured to enable the member to transmit a pre-generated draft message to the second member.

10. The method of claim 1, further comprising:
displaying a user interface element configured to enable the member to endorse the second member for a specific skill.

11. A system comprising:
a processor; and
a memory device holding an instruction set executable on the processor to cause the system to perform operations comprising:
determining, based on at least one of stored member profile attributes and historical interaction data associated with a member of an online social network service, that a second member associated with the online social network service is relevant to the member, the second member not being connected via the online social network service with the member, the determining performed by a relevance module containing a gradient-boosted machine used to calculate a confidence score indicating a likelihood that the second member is relevant to the member using a prediction model;
generating a computer game based on the second member;
displaying to the member, via one or more user interfaces, a first output of the computer game;
receiving, via the one or more user interfaces, a member response to the first output of the computer game; and
displaying, using one or more processors, a game result user interface that includes:
a game result generated based on the received member response; and
a user interface element displayed in conjunction with the game result, the user interface element configured to enable the member to connect via the online social network service with the second member in response to user selection of the user interface element.

12. The system of claim 11, wherein the generating of the computer game further comprises:
accessing a stored information item associated with the second member, the information item corresponding to an attribute-value pair;
generating the first output based on information identifying the second member and an attribute included in the attribute-value pair;
classifying a value included in the attribute-value pair as a correct game answer; and
generating one or more incorrect game answers based on additional values distinct from the value.

13. The system of claim 11, wherein the generating of the computer game further comprises:
accessing a stored information item associated with the second member, the information item corresponding to an attribute-value pair;
generating the first output based on an attribute and a value included in the attribute-value pair;
classifying information identifying the second member as a correct game answer; and
generating one or more incorrect game answers based on information identifying additional entities distinct from the second member.

14. The system of claim 11, wherein the determining that the second member is relevant further comprises:
determining that one or more attributes associated with the member match one or more attributes associated with the second member.

15. The system of claim 11, wherein the determining that the second member is relevant further comprises:
determining that the member and the second member have a member connection strength score satisfying a predetermined threshold.

16. A non-transitory machine-readable storage medium comprising instructions that, when executed by one or more processors of a machine, cause the machine to perform operations comprising:
determining, based on at least one of stored member profile attributes and historical interaction data associated with a member of an online social network service, that a second member associated with the online social network service is relevant to the member, the second member not being connected via the online social network service with the member, the determining performed by a relevance module containing a gradient-boosted machine used to calculate a confidence score indicating a likelihood that the second member is relevant to the member using a prediction model;
generating a computer game based on the second member;
displaying to the member, via one or more user interfaces, a first output of the computer game,
receiving, via the one or more user interfaces, a member response to the first output of the computer game; and
displaying, using one or more processors, a game result user interface that includes:
a game result generated based on the received member response; and
a user interface element displayed in conjunction with the game result, the user interface element configured to enable the member to connect via the online social network service with the second member in response to user selection of the user interface element.

17. The non-transitory machine-readable storage medium of claim 16, wherein the operations further comprise:
identifying a member connection of the member that is associated with an attribute matching an attribute associated with the second member; and
generating the first output based on information identifying the member connection.

18. The non-transitory machine-readable storage medium of claim 16, wherein the operations further comprise:
displaying a user interface element configured to enable the member to follow the second member.

19. The non-transitory machine-readable storage medium of claim 16, wherein the operations further comprise:

displaying a user interface element configured to enable the member to post a message on a profile page associated with the second member.

20. The non-transitory machine-readable storage medium of claim 16, wherein the operations further comprise:

displaying a message user interface configured to enable the member to transmit a pre-generated draft message to the second member.

\* \* \* \* \*

UNITED STATES PATENT AND TRADEMARK OFFICE
CERTIFICATE OF CORRECTION

PATENT NO. : 9,558,613 B2  
APPLICATION NO. : 15/185399  
DATED : January 31, 2017  
INVENTOR(S) : Nishar et al.

Page 1 of 1

It is certified that error appears in the above-identified patent and that said Letters Patent is hereby corrected as shown below:

In the Claims

In Column 20, Line 42, in Claim 16, delete "game," and insert --game;-- therefor Signed and Sealed this  
Twenty-fourth Day of April, 2018

Andrei Iancu  
*Director of the United States Patent and Trademark Office*